United States Patent
Xi et al.

(10) Patent No.: US 12,384,871 B2
(45) Date of Patent: Aug. 12, 2025

(54) COMPOSITION USEFUL FOR THE PREPARATION OF POLYURETHANE FOAMS

(71) Applicant: BASF SE, Ludwigshafen am Rhein (DE)

(72) Inventors: Bang Wei Xi, Shanghai (CN); YingHao Liu, Shanghai (CN); Zhen Peng Liang, Guangzhou (CN); Jin Lin Liu, Shanghai (CN); Bo Chen, Shanghai (CN); Ben Ben Shen, Shanghai (CN); Zi Song Zhu, Shanghai (CN)

(73) Assignee: BASF SE, Ludwigshafen am Rhein (DE)

( * ) Notice: Subject to any disclaimer, the term of this patent is extended or adjusted under 35 U.S.C. 154(b) by 840 days.

(21) Appl. No.: 17/426,371

(22) PCT Filed: Jan. 14, 2020

(86) PCT No.: PCT/EP2020/050763
§ 371 (c)(1),
(2) Date: Jul. 28, 2021

(87) PCT Pub. No.: WO2020/156800
PCT Pub. Date: Aug. 6, 2020

(65) Prior Publication Data
US 2022/0098359 A1   Mar. 31, 2022

(30) Foreign Application Priority Data
Feb. 1, 2019   (WO) ................ PCT/CN2019/074430

(51) Int. Cl.
| | | |
|---|---|---|
| *C08G 18/76* | (2006.01) | |
| *A43B 13/18* | (2006.01) | |
| *C08G 18/10* | (2006.01) | |
| *C08G 18/18* | (2006.01) | |
| *C08G 18/48* | (2006.01) | |
| *C08J 9/00* | (2006.01) | |
| *C08J 9/12* | (2006.01) | |

(52) U.S. Cl.
CPC ........ *C08G 18/7671* (2013.01); *A43B 13/187* (2013.01); *C08G 18/10* (2013.01); *C08G 18/1816* (2013.01); *C08G 18/4854* (2013.01); *C08J 9/0042* (2013.01); *C08J 9/0061* (2013.01); *C08J 9/125* (2013.01); *C08G 2410/00* (2013.01); *C08J 2203/10* (2013.01); *C08J 2375/08* (2013.01); *C08J 2483/04* (2013.01)

(58) Field of Classification Search
CPC ...... A43B 13/187; C08G 18/10; C08G 18/12; C08G 18/1816; C08G 18/3206; C08G 18/4812; C08G 18/4829; C08G 18/4854; C08G 18/6674; C08G 18/7671; C08G 2110/0066; C08G 2110/0083; C08G 2410/00; C08J 9/0042; C08J 9/0061; C08J 9/125; C08J 2203/10; C08J 2375/08; C08J 2483/04
See application file for complete search history.

(56) References Cited

U.S. PATENT DOCUMENTS 5,234,961 A   8/1993   Tanis

FOREIGN PATENT DOCUMENTS

| CA | 2204426 C | * | 7/2009 | ............ C08G 18/12 |
| CN | 102585162 A | | 7/2012 | |
| WO | 2018160945 A1 | | 9/2018 | |

OTHER PUBLICATIONS

International Search Report and Written Opinion for corresponding PCT/EP2020/050763 mailed Mar. 3, 2020, 9 Pages.

* cited by examiner

*Primary Examiner* — John M Cooney
(74) *Attorney, Agent, or Firm* — Armstrong Teasdale LLP

(57) ABSTRACT

Described herein is a polyurethane foam prepared with certain polytetrahydrofurans and optional polyether polyols. The polyurethane foam is characterized by low hardness increase at low temperature as compared with conventional polyurethane foam, and is suitable for use in products which can be exposed to low temperature such as snow boots.

18 Claims, No Drawings

COMPOSITION USEFUL FOR THE PREPARATION OF POLYURETHANE FOAMS

CROSS-REFERENCE TO RELATED APPLICATIONS

This application is a U.S. National Phase Application of International Patent Application No. PCT/EP2020/050763, filed Jan. 14, 2020, which claims priority to International Patent Application No. PCT/CN2019/074430, filed Feb. 1, 2019, the entire contents of which are hereby incorporated by reference herein.

FIELD OF THE INVENTION

The present invention relates to a polyurethane foam useful in products that can be exposed to low temperature, such as sports goods, preferably sport shoes or snow boots, more preferably shoe sole thereof.

BACKGROUND

Polyurethanes are a polymer composed of organic units joined by carbamate (urethane) links, and are typically produced by the reaction of an isocyanate with at least two isocyanate groups with a polyol with at least two hydroxyl groups. Polyurethanes are used in the manufacture of high-resilience foam seating, footwear, rigid foam insulation panels, microcellular foam seals and gaskets, durable elastomeric wheels and tires, automotive suspension bushings, electrical potting compounds, high performance adhesives, surface coatings and surface sealants, synthetic fibers, carpet underlay, hard-plastic parts, condoms, and hoses and so on.

When polyurethanes are used in the form of foams in applications such as snow boots, an important consideration is the extent of increase of hardness at low temperature, which is usually associated with discomfort feeling to the wearer. Another consideration is the rate of such increase over time, particularly in, for example, the initial four to six hours. After the initial stage, it is expected that exposure to low temperature would end as the wearer usually would not stay under the low temperature for even longer time.

U.S. Pat. No. 5,234,961A discloses a water blown integral skin polyurethane foams, obtained using a diphenylmethane diisocyanate:polytetrahydrofuran prepolymer. The polyurethane foams exhibit improved abrasion resistance and cold flex characteristics when compared to water blown integral skin foams prepared without the prepolymer. The polytetrahydrofuran has a molecular weight of 250 to 2000.

WO2018/160945A1 discloses a polyurethane elastomer foam having improved mechanical properties such as ball rebound prepared using the reaction product of a combination of polytetramethylene ether glycol (polytetrahydrofuran) having a molecular weight of 1900 to 2100 and hydroxyl value of 53 to 60, and monoethylene glycol, and 4,4'-diphenylmethane diisocyanate as isocyanate prepolymer.

However, none of these applications teaches how to produce a polyurethane foam with reduced hardness increase at low temperature or the rate thereof useful in products that can be exposed to low temperature, such as sports goods, preferably sport shoes or snow boots, more preferably shoe sole thereof.

SUMMARY OF THE INVENTION

The present Inventor has found that, using certain polytetrahydrofuran as the polyol in the preparation of polyurethane foam, the extent of hardness increase at low temperature of the polyurethane foam can be reduced significantly. In addition, using certain additional polyether polyol as additional polyol in the preparation of polyurethane foam, the reduction of the extent of hardness increase at low temperature will be reduced; however, the rate of hardness increase overtime will be significantly reduced. Based on such findings, the Inventor has obtained a series of polyurethane foams suitable for use in footwear application.

The present invention is directed to a bi-component polyurethane forming composition consisting of Components A and B, wherein Component A Comprises:
  a polytetrahydrofuran A having average functionality of hydroxyl group of no more than 3, preferably about 2, and number average molecular weight of 600 to 1500, preferably 750 to 1250, more preferably 900 to 1100 for each hydroxyl group, and
  an optional polyether polyol A other than polytetrahydrofuran having average functionality of hydroxyl group of no more than 3, preferably about 2, and number average molecular weight of 1500 to 2500, preferably 1800 to 2200 for each hydroxy group; and Component B Comprises:
  an isocyanate prepolymer having NCO content of 12% to 25% by weight, more preferably 14% to 23% by weight, most preferably 15% to 22% by weight, based on the total weight of component B,
  the isocyanate prepolymer is prepared by reacting a diisocyanates and/or a polyisocyanate with a polytetrahydrofuran B having average functionality of hydroxyl group of no more than 3, preferably about 2, and number average molecular weight of 600 to 1500, preferably 750 to 1250, more preferably 900 to 1100 for each hydroxyl group, and/or a polyether polyol B other than polytetrahydrofuran having average functionality of hydroxyl group of no more than 3, preferably about 2, and number average molecular weight of 1500 to 2500, preferably 1800 to 2200 for each hydroxy group.

Preferably, the present invention is directed to the inventive polyurethane forming composition, wherein the total of polytetrahydrofuran A and polytetrahydrofuran B is 60 to 100% by weight, preferably 60 to 80% by weight, based on the total amount of polyether polyols A and B and polytetrahydrofurans A and B in the overall polyurethane forming composition.

Preferably, the polyurethane forming composition further comprises a catalyst, a blowing agent, a surfactant, a chain extender, and other optional additives as ingredients for component A.

Preferably, the alkoxyl repeating unit in the polyether polyols A and B is selected from ethoxyl or propoxyl groups or mixture thereof.

The present invention is also directed to a process to prepare polyurethane foam from the inventive polyurethane forming composition, comprising
  i) a step of preparing the Component B by mixing the ingredients thereof and allowing the diisocyanates and/or the polyisocyanate to react with the polytetrahydrofuran B and/or the polyether polyol B,
  ii) a step of preparing the Component A by mixing the ingredients thereof, and
  iii) a step of preparing the polyurethane foam by mixing Component A and B in a mold with desired shape and allowing the isocyanate prepolymer in Component B to react with the polytetrahydrofuran A and the optional polyether polyol A other than polytetrahydrofuran in Component A.

The present invention is also directed to a polyurethane foam obtainable by the inventive process.

The present invention is also directed to a product that can be exposed to low temperature, comprising the inventive polyurethane foam.

Preferably, the product that can be exposed to low temperature is sports goods, preferably sport shoes or snow boots, more preferably shoe sole thereof.

DETAILED DESCRIPTIONS

The polyurethane foam of the present invention is produced from a bi-component polyurethane forming composition consisting of a Component A and a Component B.

Component A comprises a polytetrahydrofuran (referred to as polytetrahydrofuran A hereafter), and an optional polyether polyol other than polytetrahydrofuran (referred to as polyether polyol A hereafter). Component A may further comprise conventional additives useful in polyurethane foam production, particularly those conventionally added in Component A (i.e., the component with polyols) in the formation of polyurethane foam.

Component B comprises an isocyanate prepolymer that can be prepared by the reaction of a diisocyanate and/or a polyisocyanate with a polytetrahydrofuran (referred to as polytetrahydrofuran B hereafter) and/or a polyether polyol other than polytetrahydrofuran (referred to as polyether polyol B hereafter). Component B may further comprise conventional additives useful in polyurethane foam production, particularly those conventionally added in Component B (i.e., the component with isocyanates) in the formation of polyurethane foam.

Polytetrahydrofurans A and B can be the same or different from each other, and can be independently selected from those conventionally used in the preparation of polyurethane foams, respectively.

Polytetrahydrofurans A and B can have number average molecular weight of 1200 to 3000, preferably 1500 to 2500, more preferably 1800 to 2200, and an average hydroxyl functionality of no more than 3, preferably 2 to 3, more preferably about 2, respectively.

Polyether polyols A and B can be selected from polyether polyols conventionally used in the preparation of polyurethane foam. The polyether polyol is typically the polyaddition reaction product of an alkylene oxide (such as ethylene oxide, propylene oxide or mixture thereof) onto a starting polyol (such as glycerin, propylene glycol or mixture thereof). Apparently, polyether polyols A and B cannot be polytetrahydrofuran.

For each hydroxyl functional group in the polymeric molecule of polyether polyols A and B, polyether polyols A and B can have number average molecular weight of 1500 to 2500, preferably 1800 to 2200, respectively. For example, for the polymeric molecules of polyether polyols A and B with two hydroxyl groups, the number average molecular weight should be 3000 to 5000, preferably 3600 to 4400, on the other hand, for the polymeric molecules of polyether polyols A and B with three hydroxyl groups, the number average molecular weight should be 4500 to 7500, preferably 5400 to 6600. Polyether polyols A and B should have an average hydroxyl functionality of no more than 3, preferably 2 to 3, more preferably about 2, respectively.

The isocyanate prepolymer can be selected from those conventionally used in the preparation of polyurethane foam. The isocyanate prepolymer can be prepared by reacting a diisocyanates and/or a polyisocyanate with polytetrahydrofuran B and/or polyether polyol B using known method under known conditions. The isocyanate prepolymer is usually used as synthesized without separating the unreacted diisocyanates and/or polyisocyanates, the unreacted polytetrahydrofurans and/or polyols, and other compounds present during the synthesis. Preferably, the isocyanate prepolymer can be prepared in situ shortly before use.

The diisocyanate and/or polyisocyanate used in the preparation of the isocyanate prepolymer of the bi-component polyurethane forming composition is, for example, mixture of 4,4'-methylene diphenyl isocyanate and 2,4'-methylene diphenyl isocyanate. Preferably, the ratio of 4,4'-methylene diphenyl isocyanate is more than 60% by weight, more preferably, the ratio of 4,4'-methylene diphenyl isocyanate is more than 80% by weight, most preferably, it is substantially pure 4,4'-methylene diphenyl isocyanate.

The bi-component polyurethane forming composition of the present invention may comprise further additives that are known and conventionally used in the preparation of polyurethane foams, such as catalysts, blowing agents, surfactants and chain extenders. The additive can be added either to Component A or Component B or both, unless there is a reason to add the additive to either Component A or B or both. For example, any additive that may interfere with the reaction preparing the isocyanate prepolymer due to side reactions leading to the formation of undesirable side product cannot be added to Component B. Typically, most additives are added to Component A as the preparation of Component A is usually a mixing operation involving no chemical reaction, while the preparation of Component B may involve the reaction of isocyanate groups and hydroxyl groups.

As catalysts, it is possible to use all compounds which accelerate the reaction between isocyanate groups and hydroxyl groups. Such compounds are known and are described, for example, in "Kunststoffhandbuch, volume 7, Polyurethane", Carl Hanser Verlag, $3^{rd}$ ed. 1993, chapter 3.4.1. These compounds include amine-based catalysts and catalysts based on organic metal compounds.

Blowing agents include chemical blowing agent like water and formic acid, and physical blowing agent. Physical blowing agents are compounds which are inert toward the starting components and are usually liquid at room temperature and vaporize under the conditions of the urethane reaction. Physical blowing agents also include compounds which are gaseous at room temperature and are introduced into or dissolved in the starting components under pressure, for example carbon dioxide, low-boiling alkanes, fluoroalkanes and fluoroolefins.

Surfactants include silicone-comprising surfactants such as siloxane-oxyalkylene copolymers and other organopolysiloxanes. Alkoxylation products of fatty alcohols, oxo alcohols, fatty amines, alkylphenols, dialkylphenols, alkylcresols, alkylresorcinol, naphthol, alkylnaphthol, naphthylamine, aniline, alkylaniline, toluidine, bisphenol A, alkylated bisphenol A, polyvinyl alcohol and also further alkoxylation products of condensation products of formaldehyde and alkylphenols, formaldehyde and dialkylphenols, formaldehyde and alkylcresols, formaldehyde and alkylresorcinol, formaldehyde and aniline, formaldehyde and toluidine, formaldehyde and naphthol, formaldehyde and alkylnaphthol and also formaldehyde and bisphenol A or mixtures of two or more of these foam stabilizers can also be used.

Chain extenders for polyurethane are low molecular weight alcohol or amine compounds with two hydroxyl or amine functional groups. The most important chain extenders are 1,4-butadiol (BDO) or monoethylene glycol (MEG). Chain extenders also function as hardeners.

The polyurethane forming composition of the present invention may further comprise one or more additional additives, such as anti-hydrolysis agents, antistatic agents, flame retardants, anti-oxidants and anti-abrasion agents.

Those skilled in the art can envision that each of the respective ingredients can be a mixture. For example, polyether polyol A can be a mixture of more than one polyether polyols conventionally used in the preparation of polyurethane foam, with each of them satisfying the requirements listed above for the polyether polyol A. For another example, polytetrahydrofuran B can be a mixture of more than one polytetrahydrofurans conventionally used in the preparation of polyurethane foams, with each of them satisfying the requirements listed above for the polytetrahydrofuran B. For yet another example, the isocyanate prepolymer can be a mixture of more than one isocyanate prepolymer conventionally used in the preparation of polyurethane foam, each prepared by reacting an independently selected diisocyanates and/or a polyisocyanate with polytetrahydrofuran B and/or polyether polyol B.

In order to determine the amount of respective ingredients in the bi-component polyurethane forming composition, the amount of the isocyanate prepolymer used in the bi-component polyurethane forming composition can be determined by index as defined below:

Index=(Actual amount of isocyanate used)/(theoretical amount of isocyanate required)*100

A typical index of the bi-component polyurethane forming composition of the present invention is 85 to 105, preferably about 90 to 100, more preferably 93 to 97.

The total amount of polytetrahydrofurans A and B is more than 60% by weight, preferably 60% to 80% by weight based on the total amount of polyether polyols A and B and polytetrahydrofurans A and B in the overall polyurethane forming composition. Accordingly, the total amount of polyether polyols A and B is less than 40% by weight, preferably 20 to 40% by weight based on the total amount of polyether polyols A and B and polytetrahydrofurans A and B in the overall polyurethane forming composition.

The ratio of the total amount of polytetrahydrofuran B and polyether polyol B and the total amount of the diisocyanate and/or polyisocyanate is set in such a way so that the isocyanate prepolymer has an NCO content of 12% to 25% by weight, more preferably 14% to 23% by weight, most preferably 15% to 22% by weight, based on the total weight of component B.

In order to produce the two components A and B of the bi-component polyurethane forming composition, Component A can be prepared by mixing all the ingredients in a conventionally known manner. On the other hand, Component B can be prepared by mixing all the ingredients in a conventionally known manner, so that the reaction of the diisocyanate and/or the polyisocyanate with polytetrahydrofuran B and/or polyether polyol B happens forming the isocyanate prepolymer.

The polyurethane foam of the present invention is prepared by mixing Components A and B of the bi-component polyurethane forming composition in known process under known conditions conventionally used in the preparation of polyurethane foam.

The polyurethane foam of the present invention is advantageous in that its hardness increase under low temperature is smaller than conventional polyurethane foams. The hardness increase at a given time t under a specified low temperature is determined by exposing the sample to be measured at ambient temperature to the low temperature for a time period of t, and measure hardness of the sample as hardness (t). The hardness increase at a given time t is calculated using the following equation:

Hardness increase(t)=(hardness(t)−hardness($t_0$))/(hardness($t_0$))*100% wherein $t_0$ is zero. Essentially, the hardness ($t_0$) is the same as the hardness at ambient temperature after sufficient conditioning.

In the context of the present application, "$f_{OH}$" denotes the (average) functionality of hydroxyl group.

In the context of the present application, "low temperature" means 0° C. to −40° C., preferably −10° C. to −20° C.

EXAMPLES

Polytetrahydrofurans, 4,4'-MDI, MEG, BDO are obtained from BASF SE, Ludwigshafen, Germany and are used as received.

The amine catalyst used is N,N-dimethyl cyclohexylamine. The silicone surfactant used is Niax silicone L1507 from Momentive Performance Materials Inc., Waterford, New York, the United States. The additional additive A is acetyl tributyl citrate, the additional additive B is Irganox® 1076 from BASF SE. All these compounds are obtained commercially and used as received.

Adipic acid and MEG, BDO based polyester polyol is obtained as LUPRAPHEN H 951 from BASF SE and is used as received. Adipic acid and BDO, HDO based polyester polyol is obtained as Lupraphen® VP 9066 from BASF SE and is used as received.

Glycerin started polyether polyol and propylene glycol started polyether polyol are obtained as Lupranol® VP 9343 and Lupranol® 2043 from BASF SE and are used as received.

The "index" of the bi-component polyurethane forming composition is set to 95, unless explicitly specified otherwise.

Polyurethane foam is produced according to conventional procedure. For example, the inventive polyurethane foam can be produced as following:

i) All the ingredients of Component B are mixed so as to produce Component B; during this step, the diisocyanates and/or the polyisocyanate reacts with the polytetrahydrofuran B and/or the polyether polyol B;

ii) Parallel to this, all the ingredients for Component A is mixed so as to produce Component A;

iii) The two components A and B are mixed and introduced into a mold of desired shape so as to obtain the polyurethane foam product with the desired shape; during this step, the isocyanate prepolymer in Component B reacts with the polytetrahydrofuran A and the optional polyether polyol A other than polytetrahydrofuran in Component A.

Hardness of the polyurethane foams is determined according to the procedure listed in DIN ISO-7619-1. The size of the sample for hardness study is 20 cm (length) by 10 cm (width) by 1 cm (thickness). The sample is prepared using a mold of a cavity with the same dimension. The hardness is measured on the direction of thickness.

Mechanical properties are determined according to the procedure listed in the following standards.

| | |
|---|---|
| Density | DIN 53420 |
| Hardness | DIN ISO-7619-1 |
| Abrasion resistance | DIN ISO 4649 |
| Tensile strength | DIN 53504 |
| Elongation | DIN 53504 |
| Tear strength | DIN ISO 34-1 |
| Compression set | ASTM D 395 |

Comparative Example 1: Polyurethane Foam Prepared Using Polyester Polyol

Formula

|  |  | Weight percentage |
| --- | --- | --- |
| Component A | | |
| Adipic acid and MEG, BDO based polyester polyol | $M_n$ 2000, $f_{OH}$ 2 | 90 |
| MEG chain extender |  | 5 |
| Amine catalyst |  | 2 |
| Silicone surfactant |  | 1.8 |
| Additional additive A |  | 0.5 |
| DI Water |  | 0.7 |
| Component B | | |
| 4,4'-MDI |  | 59.5 |
| Adipic acid and MEG, BDO based polyester polyol | $M_n$ 2000, $f_{OH}$ 2 | 40 |
| Additional additive B |  | 0.5 |
| A:B mixing ratio by weight | 100:72.4 | |

Weight percentage of NCO groups in the component B: 18.22%

Hardness vs. Time

|  | Time (hour) | | | | | | | | |
| --- | --- | --- | --- | --- | --- | --- | --- | --- | --- |
|  | 0 | 1 | 2 | 3 | 4 | 6 | 8 | 12 | 16 | 24 |
| Hardness at −10° C. | 47 | 60 | 61 | 61 | 61 | 62 | 62 | 62 | 63 | 63 |
| Hardness increase % |  | 28% | 30% | 30% | 30% | 32% | 32% | 32% | 34% | 34% |
| Hardness at −20° C. | 47 | 63 | 64 | 64 | 64 | 64 | 65 | 65 | 66 | 66 |
| Hardness increase % |  | 34% | 36% | 36% | 36% | 36% | 38% | 38% | 40% | 40% |

Comparative Example 2: Polyurethane Foam Prepared Using Polyester Polyol with 1,6-Hexamethylene Diol (HDO)

Formula

|  |  | Weight percentage |
| --- | --- | --- |
| Component A | | |
| Adipic acid and BDO, HDO based polyester polyol | $M_n$ 2000, $f_{OH}$ 2 | 90 |
| BDO chain extender |  | 5 |
| Amine catalyst |  | 2 |
| Silicone surfactant |  | 1.8 |
| Additional additive A |  | 0.5 |
| DI Water |  | 0.7 |
| Component B | | |
| 4,4'-MDI |  | 59.5 |
| Adipic acid and BDO, HDO based polyester polyol | $M_n$ 2000, $f_{OH}$ 2 | 40 |
| Additional additive B |  | 0.5 |
| A:B mixing ratio by weight | 100:72.4 | |

Weight percentage of NCO groups in the component B: 18.22%

Hardness vs. Time

|  | Time (hour) | | | | | | | | |
| --- | --- | --- | --- | --- | --- | --- | --- | --- | --- |
|  | 0 | 1 | 2 | 3 | 4 | 6 | 8 | 12 | 16 | 24 |
| Hardness at −10° C. | 44 | 52 | 54 | 54 | 54 | 54 | 55 | 55 | 55 | 55 |
| Hardness increase % |  | 18% | 23% | 23% | 23% | 23% | 25% | 25% | 25% | 25% |
| Hardness at −20° C. | 44 | 55 | 57 | 57 | 57 | 57 | 57 | 58 | 58 | 58 |
| Hardness increase % |  | 25% | 30% | 30% | 30% | 30% | 30% | 32% | 32% | 32% |

Comparative Example 3: Polyurethane Foam
Prepared Using Polyether Polyol

Formula

|  |  | Weight percentage |
| --- | --- | --- |
| Component A | | |
| Propylene glycol started polyether polyol | $M_n$ 4000, $f_{OH}$ 2 | 62 |
| Glycerin started polyether polyol | $M_n$ 4800, $f_{OH}$ 3 | 25 |
| BDO chain extender | | 8 |
| Amine catalyst | | 2 |
| Silicone surfactant | | 1.8 |
| Additional additive A | | 0.5 |
| DI Water | | 0.7 |
| Component B | | |
| 4,4'-MDI | | 59.5 |
| Propylene glycol started polyether polyol | $M_n$ 4000, $f_{OH}$ 2 | 40 |
| Additional additive B | | 0.5 |
| A:B mixing ratio by weight | 100:63.2 | |

Weight percentage of NCO groups in the component B: 19.06%

Hardness vs. Time

|  | Time (hour) | | | | | | | | | |
| --- | --- | --- | --- | --- | --- | --- | --- | --- | --- | --- |
|  | 0 | 1 | 2 | 3 | 4 | 6 | 8 | 12 | 16 | 24 |
| Hardness at −10° C. | 51 | 60 | 60 | 60 | 60 | 60 | 61 | 61 | 61 | 62 |
| Hardness increase % |  | 18% | 18% | 18% | 18% | 18% | 20% | 20% | 20% | 22% |
| Hardness at −20° C. | 51 | 63 | 63 | 63 | 63 | 63 | 63 | 64 | 64 | 64 |
| Hardness increase % |  | 24% | 24% | 24% | 24% | 24% | 24% | 25% | 25% | 25% |

Comparative Example 4: Polyurethane Foam
Prepared Using Polytetrahydrofuran at Low Mn Formula

|  |  | Weight percentage |
| --- | --- | --- |
| Component A | | |
| Polytetrahydrofuran | $M_n$ 1000, $f_{OH}$ 2 | 90 |
| MEG chain extender | | 5 |
| Amine catalyst | | 2 |
| Silicone surfactant | | 1.8 |
| Additional additive A | | 0.5 |
| DI Water | | 0.7 |
| Component B | | |
| 4,4'-MDI | | 59.5 |
| Polytetrahydrofuran | $M_n$ 1000, $f_{OH}$ 2 | 40 |
| Additional additive B | | 0.5 |
| A:B mixing ratio by weight | 100:101.1 | |

Weight percentage of NCO groups in the component B: 16.54%

Hardness vs. Time

|  | Time (hour) | | | | | | | | | |
| --- | --- | --- | --- | --- | --- | --- | --- | --- | --- | --- |
|  | 0 | 1 | 2 | 3 | 4 | 6 | 8 | 12 | 16 | 24 |
| Hardness at −10° C. | 46 | 53 | 54 | 55 | 55 | 55 | 56 | 57 | 58 | 59 |
| Hardness increase % |  | 15% | 17% | 20% | 20% | 20% | 22% | 24% | 26% | 28% |
| Hardness at −20° C. | 46 | 56 | 57 | 57 | 57 | 58 | 58 | 59 | 60 | 62 |
| Hardness increase % |  | 22% | 24% | 24% | 24% | 26% | 26% | 28% | 30% | 35% |

Comparative Example 5: Polyurethane Foam Prepared Using Polytetrahydrofuran and Polyether Polyol at Low Mn Formula

|  |  | Weight percentage |
|---|---|---|
| Component A | | |
| Polytetrahydrofuran | $M_n$ 2000, $f_{OH}$ 2 | 75 |
| Propylene glycol started polyether polyol | $M_n$ 2000, $f_{OH}$ 2 | 15 |
| MEG chain extender | | 5 |
| Catalyst | | 2 |
| Surfactant | | 1.8 |
| Additional additive A | | 0.5 |
| DI Water | | 0.7 |
| Component B | | |
| 4,4'-MDI | | 59.5 |
| Propylene glycol started polyether polyol | $M_n$ 2000, $f_{OH}$ 2 | 40 |
| Additional additive B | | 0.5 |
| A:B mixing ratio by weight | 100:72.4 | |

Weight percentage of total polytetrahydrofuran in total polytetrahydrofuran and propylene glycol started polyether polyol: 62.84%
Weight percentage of NCO groups in the component B: 18.22%

Hardness vs. Time

| | Time (hour) | | | | | | | | | |
|---|---|---|---|---|---|---|---|---|---|---|
| | 0 | 1 | 2 | 3 | 4 | 6 | 8 | 12 | 16 | 24 |
| Hardness at −10° C. | 46 | 58 | 58 | 58 | 58 | 59 | 59 | 59 | 60 | 60 |
| Hardness increase % | | 26% | 26% | 26% | 26% | 28% | 28% | 28% | 30% | 30% |
| Hardness at −20° C. | 46 | 60 | 60 | 60 | 60 | 60 | 61 | 61 | 62 | 62 |
| Hardness increase % | | 30% | 30% | 30% | 30% | 30% | 33% | 33% | 35% | 35% |

Comparative Example 6: Polyurethane Foam Prepared Using Polytetrahydrofuran at Low Polytetrahydrofuran Ratio in Total Polyol Except Hardeners Formula

|  |  | Weight percentage |
|---|---|---|
| Component A | | |
| Polytetrahydrofuran | $M_n$ 2000, $f_{OH}$ 2 | 60 |
| Propylene glycol started polyether polyol | $M_n$ 4000, $f_{OH}$ 2 | 30 |
| MEG chain extender | | 5 |
| Amine catalyst | | 2 |
| Silicone surfactant | | 1.8 |
| Additional additive A | | 0.5 |
| DI Water | | 0.7 |
| Component B | | |
| 4,4'-MDI | | 59.5 |
| Propylene glycol started polyether polyol | $M_n$ 4000, $f_{OH}$ 2 | 40 |
| Additional additive B | | 0.5 |
| A:B mixing ratio by weight | 100:65.7 | |

Weight percentage of total polytetrahydrofuran in total polytetrahydrofuran and propylene glycol started polyether polyol: 51.6%
Weight percentage of NCO groups in the component B: 19.06

Hardness vs. Time

| | Time (hour) | | | | | | | | | |
|---|---|---|---|---|---|---|---|---|---|---|
| | 0 | 1 | 2 | 3 | 4 | 6 | 8 | 12 | 16 | 24 |
| Hardness at −10° C. | 46 | 52 | 52 | 52 | 53 | 53 | 53 | 53 | 53 | 53 |
| Hardness increase % | | 13% | 13% | 13% | 15% | 15% | 15% | 15% | 15% | 15% |
| Hardness at −20° C. | 46 | 55 | 55 | 56 | 56 | 56 | 56 | 56 | 56 | 56 |
| Hardness increase % | | 20% | 20% | 22% | 22% | 22% | 22% | 22% | 22% | 22% |

Mechanical Properties

|   |   |
|---|---|
| Density (g/cm³) | 0.40 ± 0.01 |
| Abrasion resistance (mm³) | 471 |
| Tensile strength (N/mm²) | 3.16 |
| Elongation (%) | 339.6 |
| Tear strength (N/mm) | 13.09 |
| Compression set (%) | 9.0 |

Inventive Example 7

Formula

|  |  | Weight percentage |
|---|---|---|
| Component A | | |
| Polytetrahydrofuran | $M_n$ 2000, $f_{OH}$ 2 | 90 |
| MEG chain extender | | 5 |
| Amine catalyst | | 2 |
| Silicone surfactant | | 1.8 |
| Additional additive A | | 0.5 |
| DI Water | | 0.7 |
| Component B | | |
| 4,4'-MDI | | 59.5 |
| Polytetrahydrofuran | $M_n$ 2000, $f_{OH}$ 2 | 40 |
| Additional additive B | | 0.5 |
| A:B mixing ratio by weight | 100:72.4 | |

Weight percentage of NCO groups in the component B: 18.22%

Hardness vs. Time

| | Time (hour) | | | | | | | | | |
|---|---|---|---|---|---|---|---|---|---|---|
| | 0 | 1 | 2 | 3 | 4 | 6 | 8 | 12 | 16 | 24 |
| Hardness at −10° C. | 48 | 49 | 49 | 50 | 51 | 52 | 53 | 54 | 57 | 58 |
| Hardness increase % | | 2% | 2% | 4% | 6% | 8% | 10% | 13% | 19% | 21% |
| Hardness at −20° C. | 48 | 50 | 51 | 52 | 52 | 54 | 55 | 57 | 59 | 60 |
| Hardness increase % | | 4% | 6% | 8% | 8% | 13% | 15% | 19% | 23% | 25% |

Mechanical Properties

|   |   |
|---|---|
| Density (g/cm³) | 0.40 ± 0.01 |
| Abrasion resistance (mm³) | 78 |
| Tensile strength (N/mm²) | 4.35 |
| Elongation (%) | 380.1 |
| Tear strength (N/mm) | 19.17 |
| Compression set (%) | 7.4 |

Inventive Example 8

Formula

|  |  | Weight percentage |
|---|---|---|
| Component A | | |
| Polytetrahydrofuran | $M_n$ 1800, $f_{OH}$ 2 | 90 |
| MEG chain extender | | 5 |
| Amine catalyst | | 2 |
| Silicone surfactant | | 1.8 |
| Additional additive A | | 0.5 |
| DI Water | | 0.7 |
| Component B | | |
| 4,4'-MDI | | 59.5 |
| Polytetrahydrofuran | $M_n$ 1800, $f_{OH}$ 2 | 40 |
| Additional additive B | | 0.5 |
| A:B mixing ratio by weight | 100:75.1 | |

Weight percentage of NCO groups in the component B: 18.03%

Hardness vs. Time

|  | Time (hour) | | | | | | | | | |
| --- | --- | --- | --- | --- | --- | --- | --- | --- | --- | --- |
|  | 0 | 1 | 2 | 3 | 4 | 6 | 8 | 12 | 16 | 24 |
| Hardness at −10° C. | 47 | 48 | 49 | 50 | 51 | 52 | 53 | 54 | 56 | 57 |
| Hardness increase % |  | 2% | 4% | 6% | 9% | 11% | 13% | 15% | 19% | 21% |
| Hardness at −20° C. | 47 | 49 | 50 | 51 | 52 | 53 | 55 | 57 | 59 | 59 |
| Hardness increase % |  | 4% | 6% | 9% | 11% | 13% | 17% | 21% | 26% | 26% |

Mechanical Properties

| | |
| --- | --- |
| Density (g/cm$^3$) | 0.40 ± 0.01 |
| Abrasion resistance (mm$^3$) | 96 |
| Tensile strength (N/mm$^2$) | 4.22 |
| Elongation (%) | 351.3 |
| Tear strength (N/mm) | 18.78 |
| Compression set (%) | 7.7 |

Inventive Example 9

Formula

|  |  | Weight percentage |
| --- | --- | --- |
| Component A | | |
| Polytetrahydrofuran | $M_n$ 2000, $f_{OH}$ 2 | 70 |
| Glycerin started polyether polyol | $M_n$ 6000, $f_{OH}$ 3 | 20 |
| MEG chain extender |  | 5 |
| Catalyst |  | 2 |
| Surfactant |  | 1.8 |
| Additional additive A |  | 0.5 |
| DI Water |  | 0.7 |
| Component B | | |
| 4,4'-MDI |  | 59.5 |
| Polytetrahydrofuran | $M_n$ 2000, $f_{OH}$ 2 | 40 |
| Additional additive B |  | 0.5 |
| A:B mixing ratio by weight | 100:70.1 | |

Weight percentage of total polytetrahydrofuran in total polytetrahydrofuran and Glycerin started polyether polyol: 83.06%
Weight percentage of NCO groups in the component B: 18.22%

Hardness vs. Time

|  | Time (hour) | | | | | | | | | |
| --- | --- | --- | --- | --- | --- | --- | --- | --- | --- | --- |
|  | 0 | 1 | 2 | 3 | 4 | 6 | 8 | 12 | 16 | 24 |
| Hardness at −10° C. | 46 | 48 | 49 | 50 | 50 | 51 | 51 | 52 | 53 | 53 |
| Hardness increase % |  | 4% | 7% | 9% | 9% | 11% | 11% | 13% | 15% | 15% |
| Hardness at −20° C. | 47 | 49 | 50 | 51 | 52 | 53 | 55 | 57 | 59 | 59 |
| Hardness increase % |  | 4% | 6% | 9% | 11% | 13% | 17% | 21% | 26% | 26% |

Mechanical Properties

| | |
| --- | --- |
| Density (g/cm$^3$) | 0.40 ± 0.01 |
| Abrasion resistance (mm$^3$) | 187 |
| Tensile strength (N/mm$^2$) | 3.97 |
| Elongation (%) | 369.3 |
| Tear strength (N/mm) | 18.19 |
| Compression set (%) | 7.9 |

Inventive Example 10

Formula

|  |  | Weight percentage |
| --- | --- | --- |
| Component A | | |
| Polytetrahydrofuran | $M_n$ 2000, $f_{OH}$ 2 | 75 |
| Glycerin started polyether polyol | $M_n$ 6000, $f_{OH}$ 3 | 15 |

-continued

| | | Weight percentage |
|---|---|---|
| MEG chain extender | | 5 |
| Amine catalyst | | 2 |
| Silicone surfactant | | 1.8 |
| Additional additive A | | 0.5 |
| DI Water | | 0.7 |
| Component B | | |
| 4,4'-MDI | | 59.5 |
| Glycerin started polyether polyol | $M_n$ 6000, $f_{OH}$ 3 | 20 |
| Propylene glycol started polyether polyol | $M_n$ 4000, $f_{OH}$ 2 | 20 |
| Additional additive B | | 0.5 |
| A:B mixing ratio by weight | 100:67.3 | |

Weight percentage of total polytetrahydrofuran in total polytetrahydrofuran and Glycerin started polyether polyol: 64.14%
Weight percentage of NCO groups in the component B: 19.06%

Hardness vs. Time

| | Time (hour) | | | | | | | | |
|---|---|---|---|---|---|---|---|---|---|
| | 0 | 1 | 2 | 3 | 4 | 6 | 8 | 12 | 16 | 24 |
| Hardness at −10° C. | 44 | 46 | 47 | 47 | 48 | 48 | 48 | 49 | 49 | 49 |
| Hardness increase % | | 5% | 7% | 7% | 9% | 9% | 9% | 11% | 11% | 11% |
| Hardness at −20° C. | 47 | 49 | 50 | 51 | 52 | 53 | 55 | 57 | 59 | 59 |
| Hardness increase % | | 4% | 6% | 9% | 11% | 13% | 17% | 21% | 26% | 26% |

Mechanical Properties

| | |
|---|---|
| Density (g/cm³) | 0.40 ± 0.01 |
| Abrasion resistance (mm³) | 246 |
| Tensile strength (N/mm²) | 3.51 |
| Elongation (%) | 323.6 |
| Tear strength (N/mm) | 15.09 |
| Compression set (%) | 8.2 |

From the experimental data in Examples 1 to 10, the following conclusion can be drawn.

Using the polytetrahydrofuran as defined in the present invention, the polyurethane foam as prepared has a low hardness increase at low temperature as compared with conventional polyurethane foam. This is particularly apparent from the comparison of Examples 1+2+3 and 7+8. This shows that the polyurethane foam is suitable for the use in products that can be exposed to low temperature, such as sports goods, preferably sport shoes or snow boots, more preferably shoe sole thereof, where low hardness increase under low temperature is desired.

Using the combination of polytetrahydrofuran and polyether polyol as defined in the present invention, the polyurethane foam as prepared has even lower hardness increase at low temperature over a long time as compared with conventional polyurethane foam, although the hardness increase over the initial a few hours are higher than using polytetrahydrofuran alone. This is particularly apparent from the comparison of Examples 7+8 and 9+10. This shows that the polyurethane foam is suitable for the use in products that can be exposed to low temperature, such as sports goods, preferably sport shoes or snow boots, more preferably shoe sole thereof, where low hardness increase under low temperature over a long time frame is desired.

The polyurethane prepared using polytetrahydrofuran alone and the combination of polytetrahydrofuran and polyether polyol are both useful. For snow boot application, in many cases, the snow boot is not exposed to low temperature for a prolonged time period, such as more than four to six hours. The polyurethane prepared using polytetrahydrofuran alone will provide low hardness increase for such application. However, the hardness increase is slightly higher after the prolonged time period. This is usually not a problem as snow boots are typically not be expected to be exposed to low temperature for such long time. On the other hand, for those cases in which the snow boots are exposed to low temperature for a prolonged time period, such as more than four to six hours, although the polyurethane prepared using the combination of polytetrahydrofuran and polyether polyol cannot provide a very good hardness increase under low temperature in the initial hours (yet it is still acceptable), the hardness increase will be kept low even after the prolonged time period, rendering the polyurethane particularly useful for such applications. However, the content of polyether polyol cannot be very high, otherwise, the mechanical properties, particularly anti-abrasion will be poor.

Those skilled in the art can envision that the inventive polyurethane foam can be used in any other applications that such properties are desirable.

The invention claimed is:

1. A bi-component polyurethane forming composition consisting of Components A and B, wherein
    Component A comprises
        a polytetrahydrofuran A having an average functionality of hydroxyl groups of no more than 3 and a number average molecular weight of 600 to 1500 for each hydroxyl group, and
        an optional polyether polyol A other than polytetrahydrofuran having an average functionality of hydroxyl groups of no more than 3 and a number average molecular weight of 1500 to 2500 for each hydroxy group; and
    Component B comprises
        an isocyanate prepolymer having NCO content of 12% to 25% by weight based on the total weight of component B,
        wherein the isocyanate prepolymer is prepared by reacting a diisocyanate and/or a polyisocyanate with a polytetrahydrofuran B having an average functionality of hydroxyl groups of no more than 3 and a number average molecular weight of 600 to 1500, for each hydroxyl group, and/or a polyether polyol B other than polytetrahydrofuran having an average functionality of hydroxyl groups of no more than 3 and a number average molecular weight of 1500 to 2500 for each hydroxy group,
    wherein the total amount of polytetrahydrofuran A is 60 to 80% by weight, based on the total amount of polyether polyols A and B and polytetrahydrofuran A in the overall polyurethane forming composition.

2. The polyurethane forming composition of claim 1, further comprising a catalyst, a blowing agent, a surfactant, a chain extender, and other optional additives as ingredients for component A.

3. The polyurethane forming composition of claim 1, wherein the alkoxyl repeating unit in the polyether polyols A and B is selected from the group consisting of ethoxyl groups, propoxyl groups, and mixture thereof.

4. A process to prepare polyurethane foam from the polyurethane forming composition of claim 1, comprising
i) a step of preparing the Component B by mixing the ingredients thereof and allowing the diisocyanate and/or the polyisocyanate to react with the polytetrahydrofuran B and/or the polyether polyol B,
ii) a step of preparing the Component A by mixing the ingredients thereof, and
iii) a step of preparing the polyurethane foam by mixing Component A and B in a mold with a desired shape and allowing the isocyanate prepolymer in Component B to react with the polytetrahydrofuran A and the optional polyether polyol A other than polytetrahydrofuran in Component A.

5. A polyurethane foam obtained by the process of claim 4.

6. A product which can be exposed to low temperature, comprising the polyurethane foam of claim 5.

7. The product of claim 6, wherein the product is a sports good.

8. The polyurethane forming composition of claim 1, wherein the Component A comprises as only polyol component a polytetrahydrofuran A having an average functionality of hydroxyl group groups of about 2.

9. The polyurethane forming composition of claim 1, wherein the Component A comprises as only polyol component a polytetrahydrofuran A having a number average molecular weight of 750 to 1250 for each hydroxyl group.

10. The polyurethane forming composition of claim 1, wherein Component A comprises a polyether polyol A other than polytetrahydrofuran having an average functionality of hydroxyl groups of about 2.

11. The polyurethane forming composition of claim 1, wherein Component A comprises a polyether polyol A other than polytetrahydrofuran having a number average molecular weight of 1800 to 2200 for each hydroxy group.

12. The polyurethane forming composition of claim 1, wherein Component B comprises an isocyanate prepolymer having NCO content of 14% to 23% by weight, based on the total weight of component B.

13. The polyurethane forming composition of claim 1, wherein the isocyanate prepolymer is prepared by reacting a diisocyanate and/or a polyisocyanate with a polytetrahydrofuran B having an average functionality of hydroxyl groups of about 2.

14. The polyurethane forming composition of claim 1, wherein the isocyanate prepolymer is prepared by reacting a diisocyanate and/or a polyisocyanate with a polytetrahydrofuran B having a number average molecular weight of 750 to 1250 for each hydroxyl group.

15. The polyurethane forming composition of claim 1, wherein the isocyanate prepolymer is prepared by reacting a diisocyanate and/or a polyisocyanate with a polyether polyol B other than polytetrahydrofuran having an average functionality of hydroxyl groups of about 2.

16. The polyurethane forming composition of claim 1, wherein the isocyanate prepolymer is prepared by reacting a diisocyanate and/or a polyisocyanate with a polyether polyol B other than polytetrahydrofuran having a number average molecular weight of 1800 to 2200 for each hydroxy group.

17. The product of claim 6, wherein the product is a sports shoe or snow boot.

18. The product of claim 6, wherein the product is a shoe sole of a sports shoe or snow boot.

* * * * *